(12) United States Patent
Higgins

(10) Patent No.: US 7,234,663 B1
(45) Date of Patent: Jun. 26, 2007

(54) BUBBLE CLOUD ACOUSTIC DAMPING FOR LAUNCH VEHICLE FAIRING

(75) Inventor: John E. Higgins, Los Lunas, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 29 days.

(21) Appl. No.: 11/152,529

(22) Filed: Jun. 14, 2005

(51) Int. Cl.
*B64C 1/40* (2006.01)
(52) U.S. Cl. ...................................... 244/1 N
(58) Field of Classification Search ............... 244/1 N, 244/173.1, 173.2, 133, 117 R; 428/116; 181/290–292, 283
See application file for complete search history.

(56) References Cited

U.S. PATENT DOCUMENTS

| 2,248,844 | A | * | 7/1941 | Seymour | 220/265 |
| 3,084,651 | A | * | 4/1963 | Parmenter | 181/235 |
| 3,523,858 | A | * | 8/1970 | Schudel | 428/116 |
| 4,035,535 | A | * | 7/1977 | Taylor | 428/116 |
| 5,670,758 | A | * | 9/1997 | Borchers et al. | 181/286 |
| 6,224,020 | B1 | * | 5/2001 | Hopkins et al. | 244/173.1 |
| 6,231,710 | B1 | * | 5/2001 | Herup et al. | 156/173 |
| 6,394,394 | B1 | * | 5/2002 | Raun et al. | 244/173.1 |

* cited by examiner

*Primary Examiner*—Tien Dinh
(74) *Attorney, Agent, or Firm*—Kenneth E. Callahan

(57) ABSTRACT

A launch vehicle payload fairing incorporating hollow cavities filled with an aerated fluid for the reduction of acoustic noise during launch. The fairing may also include a fluid ejection system for subsequent weight reduction.

2 Claims, 6 Drawing Sheets

Section A-A
Scale 1:45

Detail 1
Scale 1:15

Section A-A
Scale 1:45

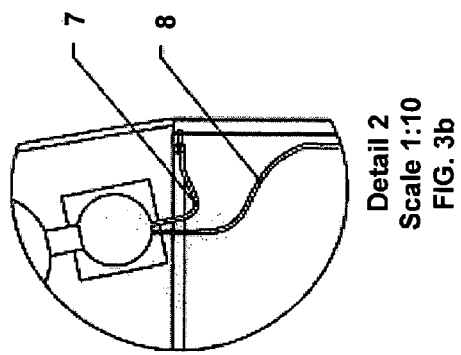
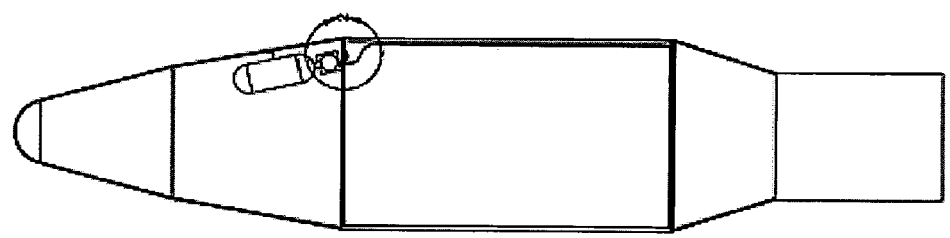
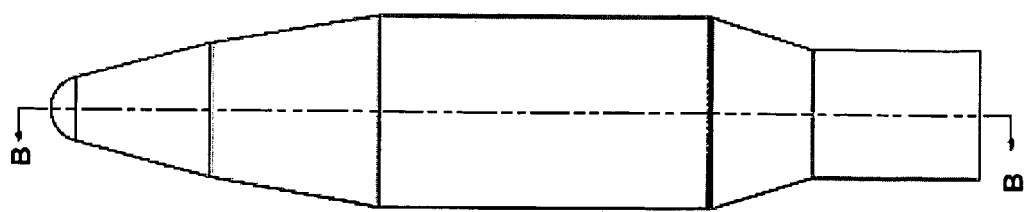

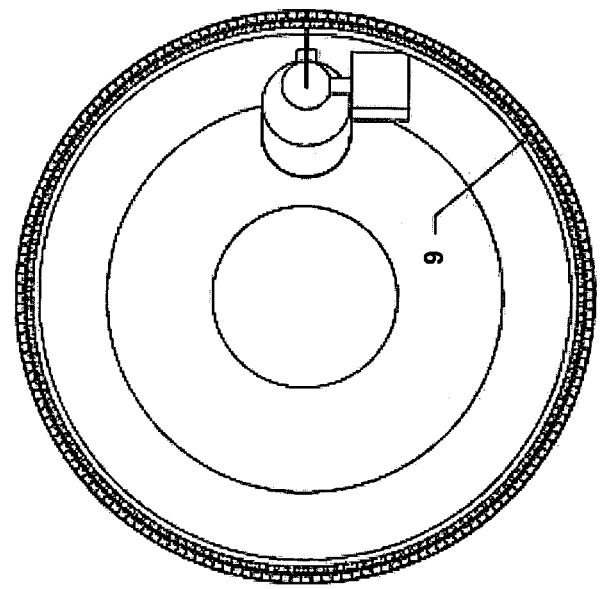
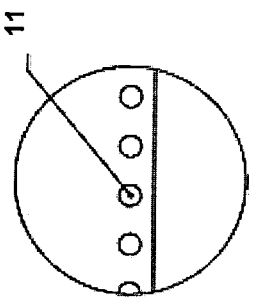
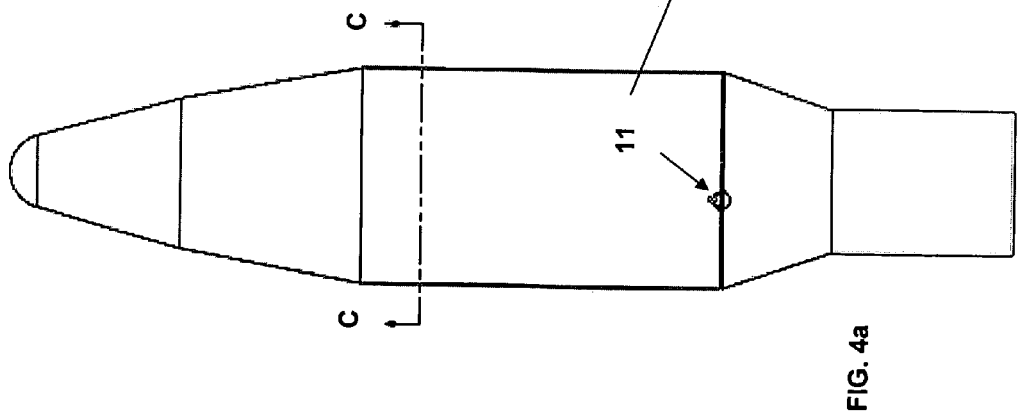
Section C-C
Scale 1:15
FIG. 4c
Detail 3
Scale 1:3
FIG. 4b
FIG. 4a Section D-D
Scale 1:12

BUBBLE CLOUD ACOUSTIC DAMPING FOR LAUNCH VEHICLE FAIRING

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BRIEF DESCRIPTION OF THE DRAWINGS

FIG. 3a is another view of the air delivery system.
FIG. 3b is another detail view of the air delivery system showing the air supply lines.
FIG. 4a is a forward end section view showing the location of the evacuation plugs.
FIG. 4b is a detail of the evacuation plugs.
FIG. 4c shows the high pressure manifold.

DESCRIPTION OF THE PREFERRED EMBODIMENT

Figure 1:
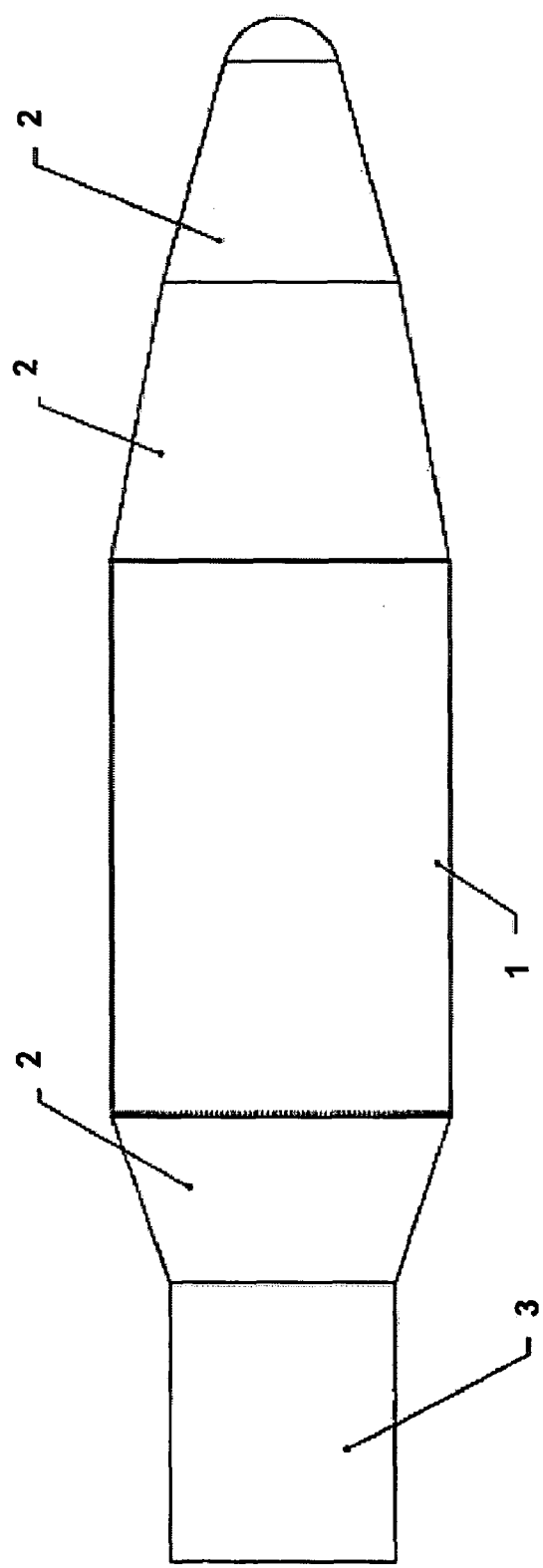
FIG. 1 shows a typical launch vehicle fairing.
Figure 2B:
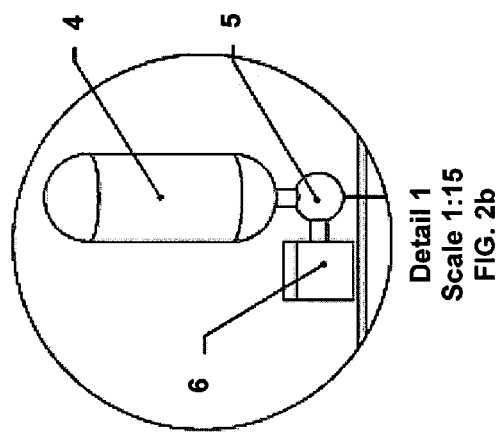
FIG. 2b is a detailed view of the air delivery system.
Figure 2A:
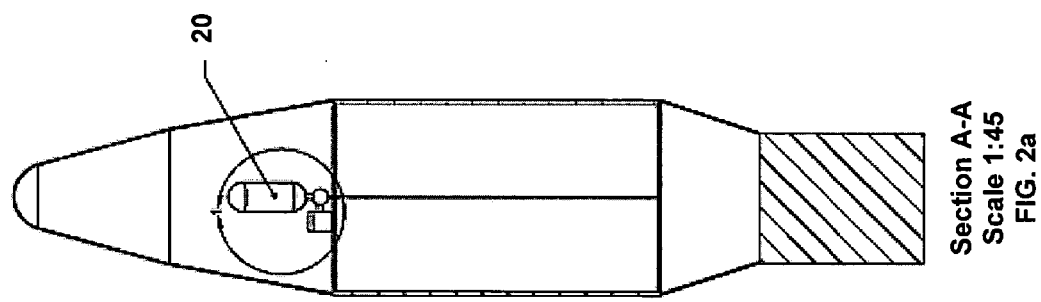
FIG. 2a is an axial section view showing the air delivery system.
Figure 2:
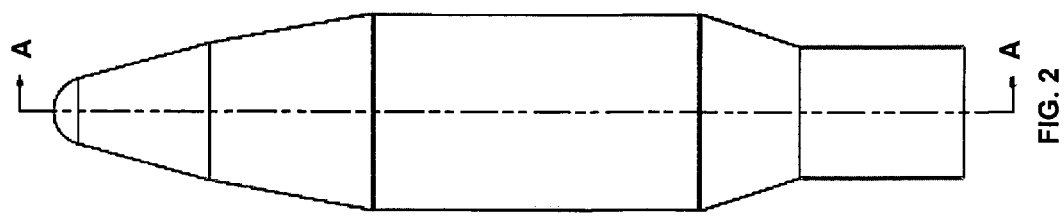
Figure 5B:
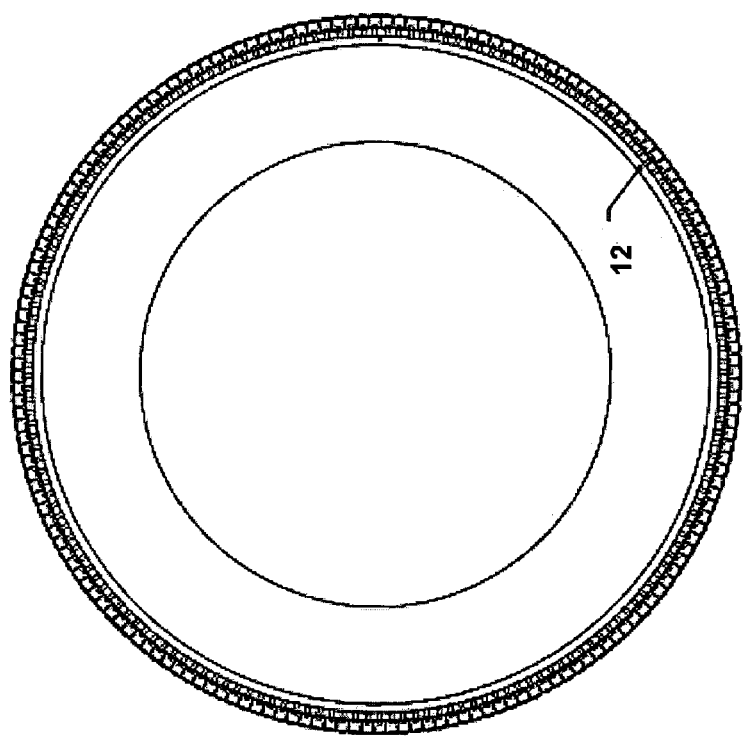
FIG. 5b shows the low pressure manifold.
Figure 5A:
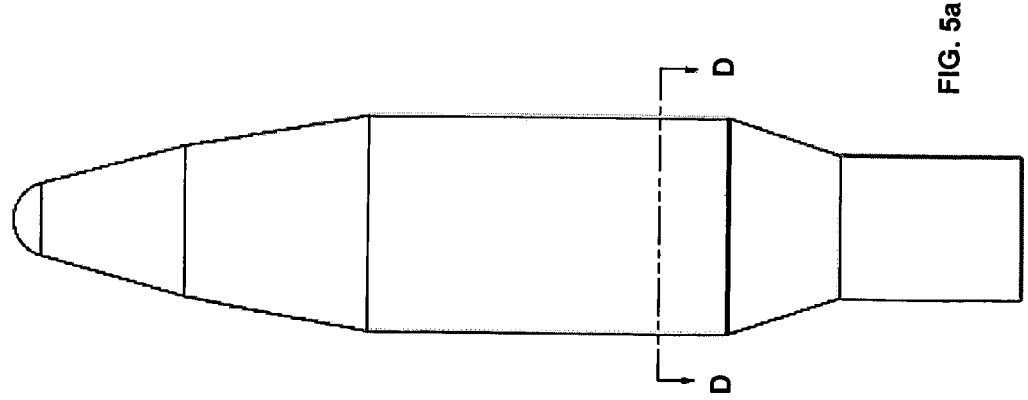
FIG. 5a is an aft end section view.
Figure 6:
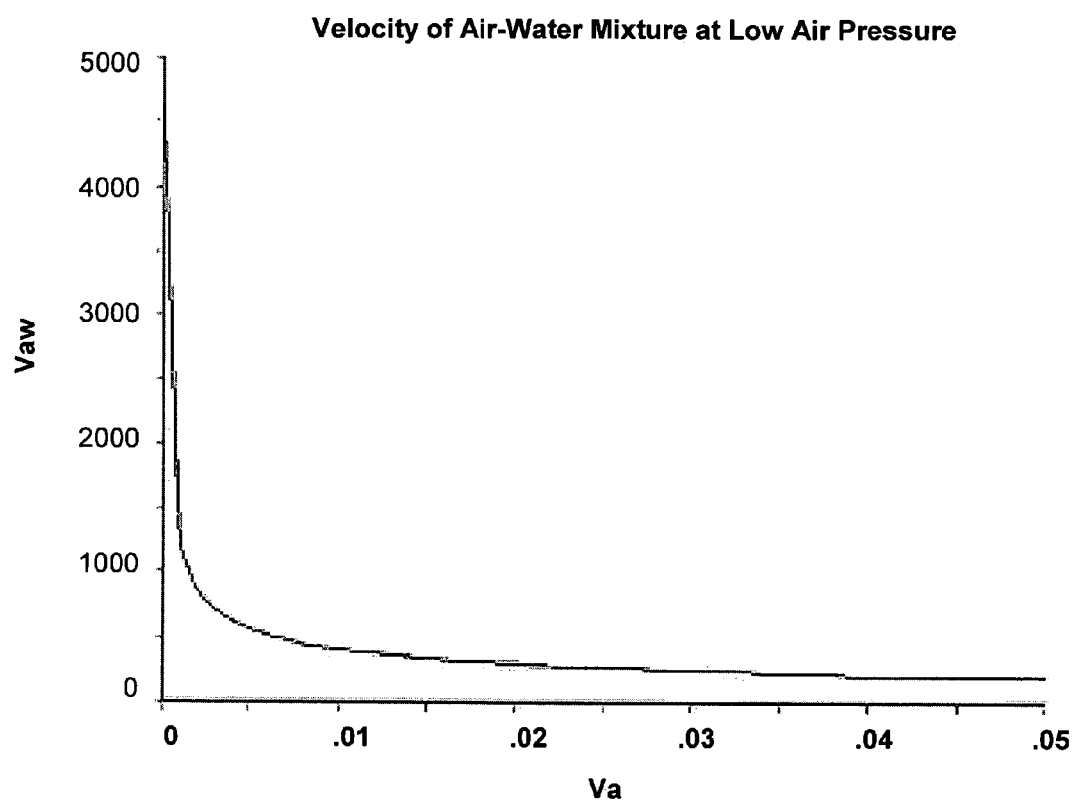
FIG. 6 is a calculated plot of the P-wave velocity (Vaw) for low air content water mixtures.

Launch vehicle payload fairings frequently incorporate hollow cavities which are sealed by an inner and outer skin. Usually the cavities are air filled. Because this double skin configuration results in poor acoustic mitigation of launch propulsion noise, additional techniques have been employed. For example, sound proofing blankets have been added (U.S. Pat. No. 6,224,020), water has been introduced to fill these voids to reduce acoustic transmission by mass damping (U.S. Pat. No. 6,394,394), and holes have been introduced into the cavities to convert them into Helmholtz resonators (U.S. Pat. No. 6,231,710 and hereby incorporated by reference).

Filling the hollow cavities with water provides mass damping resulting from an impedance mismatch at both faces of the interior of the water-filled void. The acoustic noise at the outer skin is reflected more readily back into the atmosphere by the mass damping of the water. The acoustic noise passing the outer skin is more readily trapped in the water rather than passing to the inner skin as a result of the mass damping. The addition of air bubbles in the water greatly enhances the ability of the water to trap and damp out acoustic noise. It is well established that even very small amounts of air-entrapped in water will greatly reduce the speed of sound in water. This effect is a macroscopic manifestation of the microscopic impedance mismatches resulting from the inefficient reflections of sound in the air/water mixture. The air bubbles act as individual dampers, thus reducing the amplitude of acoustic transmissions.

To create an air-water mixture, compressed air is filtered into the water at the bottom of each cavity and vented to the atmosphere at the top of the fairing internal cavity. All of the water can be ejected from the fairing after peak acoustic loads have subsided, usually only tens of seconds into the flight, in order to improve payload lift capacity. Various means of creating an air-water mixture can be used to create the same damping effect. Water-based gels can be whipped to incorporate significant air voids. Combinations of lightweight non-water based fluids and gels with gas filled bubbles can also achieve this same enhanced acoustic attenuation.

Low percentages of air bubbles in water or similar media with spacing on the order of a few centimeters change the P-wave velocity of water dramatically and also provide a refraction mechanism for these waves, preventing effective transit of the waves radially from outer wall to inner wall of the hollow core fairing. This effect has been demonstrated in a ChamberCore cylinder representing a fairing substructure (U.S. Pat. No. 6,231,710). Acoustic energy becomes trapped through multiple refractions in the aerated media and dissipates rapidly through viscous fluid movement and dynamic reflections at bubble interfaces.

Bubble volumes must be sufficiently low that bubbles do not coalesce into pockets between interior and exterior walls of the fairing resulting in increased acoustic transmission. Bubble spacing must be balanced against p-wave velocity reduction. P-wave velocity is a function of air volume. Bubble spacing is a function of air volume, surface tension of the fluid, fluid pressure, and other factors. For the ChamberCore experiments air entrained in tap water at atmospheric pressure resulted in bubbles 2 to 5 mm in maximum dimension with spacing of roughly 2 cm. The water air mixture P-wave velocity for this configuration is 5 m/sec resulting in average (400 Hz) acoustic wavelengths of 1.25 cm. Frequencies of 10 to 400 Hz generate most damage to typical payloads. For refraction to occur P-wave wavelengths on the order of the bubble spacing must be generated. Consequently lower frequency acoustic impedance would require higher volume concentrations of bubbles, which can be obtained without forming air pockets by introducing detergents or similar agents to reduce bubble surface tension and produce smaller bubbles. The smaller bubbles will form more uniformly in the water media without generating detrimental air pockets.

The result of this bubble media interaction is to block most sound transmission through the fluid. Sound transmission through the remaining structure connecting the inner and outer walls is affected only secondarily. In the ChamberCore experiment for example, vertical webs of relatively light, stiff carbon composite connect inner and outer walls. This composite media is conducive to acoustic transmission and once the air in the voids of the ChamberCore is replaced by high-density fluid or aerated fluid these webs become the dominant acoustic path. This does not mean that more acoustic energy is transmitted through the webs. The aerated fluid becomes a further trap for acoustic energy radiated into the fluid by the web, but some of the acoustic energy continues through the web to the inner wall and is radiated into the payload chamber. Filling the voids of the ChamberCore with an aerated fluid does not address mechanisms for reducing direct transmission through such internal structure, but does address suppression of sound radiated by the inner structure into the aerated media. Providing a higher surface area for internal structures will increase acoustic radiation from these internal structures to the aerated media acoustic trap.

Acoustic radiation damping can be adjusted for acoustic frequency ranges of interest by adjusting fluid density, bubble volume, bubble size and bubble spacing. Mixture pressure, fluid viscosity, and bubble surface tension can be adjusted to impact these factors.

Fairing applications for this technology would benefit by ejection of the aerated media after the launch vehicle has escaped ground reflections from the rocket motors. After a few thousand feet of altitude has been gained by the launch vehicle, the aerated media may be pressurized at the upper free surface of the fluid with a low pressure manifold and vented from ports at the base of the fairing. For example, in the case of the ChamberCore architecture, 5 psi pressure is adequate to vent 60 vertical feet of ChamberCore in less than 10 seconds. The venting prevents significant reduction of payload mass that would result if the aerated media were carried to fairing separation at the edge of the sensible atmosphere, 45,000 to 100,000 m for most fairings. Thin adhesive membranes of aluminum sheeting or plastic film would temporarily plug vents at the base of the fairing. These membranes could be ruptured at a controlled altitude by electrically heated wires, mechanical actuators, transient pressure overloads or similar mechanisms. Typical delay times for initiation of venting depend on launch vehicle size and acceleration from the surface of the earth, but would typically range from a few seconds for small launch vehicles to a few tens of seconds for the largest launch vehicles.

FIG. 1 shows a typical payload fairing with the cylindrical (ChamberCore) section 1 being the part that contains the gas/fluid mixture, the other sandwich panel sections 2, and a small part of the launch vehicle 3. FIG. 2*a* is a cross-section of the fairing showing the air delivery system 20. A detailed view of the air delivery system 20 is shown in FIG. 2*b* comprised of an air tank 4, a pressure regulator 5, and an electronic controller 6. FIG. 3*a* and FIG. 3*b* is another view of the air delivery system 20 showing the high pressure air supply line 7 used to expel the fluid at altitude and the low pressure air supply line 8 for supplying the bubbles. Both draw from the same air tank 4. FIG. 4*a* is a forward end section view showing the location of the frangible foil plugs 11 used for fluid evacuation with detail shown in FIG. 4*b*. FIG. 4*c* indicates the high pressure manifold 9 used for expelling the fluid. FIG. 5*a* is an aft end section view with detail of the low pressure manifold 12 used to supply bubbles in the fluid.

FIG. 6 is a calculated plot of the P-wave velocity (Vaw) for low air content water mixtures. This shows that the P-wave velocity goes down rapidly for an air-water mixture as air content is increased a few percent (Va). This is because the bulk modulus of the mixture softens a lot without changing the density of the mixture much from water alone. The P-wave velocity is in ft/sec and the air volume is in cubic inches.

The invention claimed is:

1. A launch vehicle payload fairing having a plurality of hollow cavities filled with a liquid with a drain mechanism for expelling said liquid at a controlled altitude, wherein the improvement comprises:

a. a high pressure gas source;

b. gas vents at the top of said cavities;

c. means to continuously aerate said liquid with gas bubbles, the liquid density, bubble volume, bubble size, and bubble spacing of said aerated liquid being optimized for the acoustic frequencies associated with any particular launch vehicle, whereby the transmission of acoustic energy from the outer to the inner wall of the payload fairing is significantly decreased.

2. The payload fairing of claim 1, wherein said aerated liquid is comprised of air and water with a bubble diameter of 2 to 5 mm and a bubble spacing of approximately 1.25 cm.

* * * * *